Sept. 29, 1964  R. L. STEVENS  3,150,841
CONTINUOUS MOTION PICTURE FILM PROJECTION APPARATUS
Filed Oct. 27, 1960  3 Sheets-Sheet 1

INVENTOR.
RICHARD L. STEVENS
BY FULWIDER, MATTINGLY
& HUNTLEY
ATTORNEYS

Sept. 29, 1964 R. L. STEVENS 3,150,841
CONTINUOUS MOTION PICTURE FILM PROJECTION APPARATUS
Filed Oct. 27, 1960 3 Sheets-Sheet 2

INVENTOR.
RICHARD L. STEVENS
BY FULWIDER, MATTINGLY
& HUNTLEY
ATTORNEYS

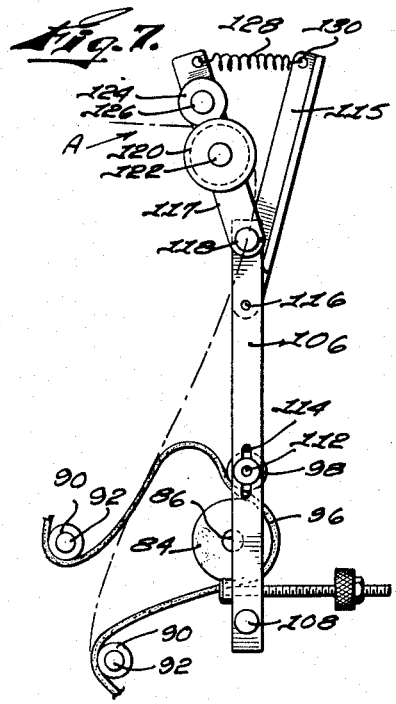
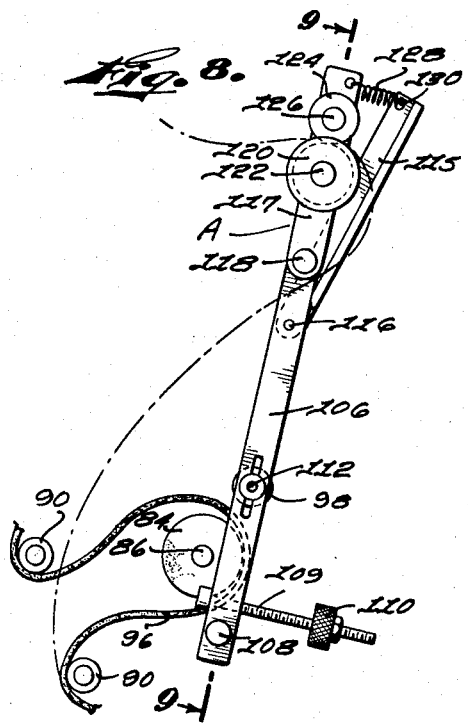
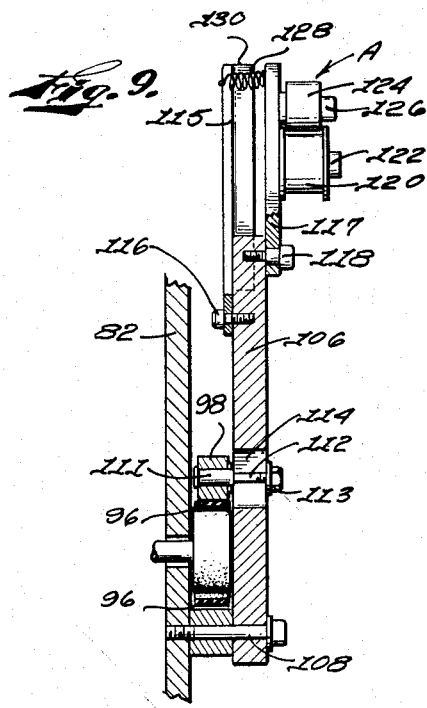
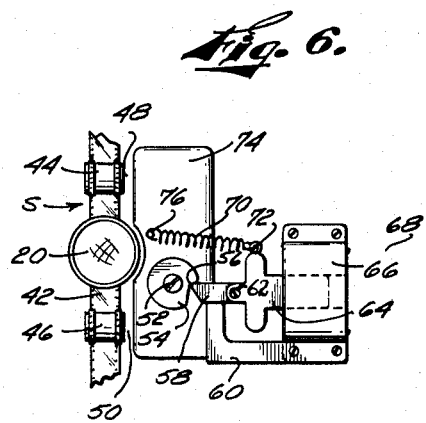
INVENTOR.
RICHARD L. STEVENS
BY FULWIDER, MATTINGLY
& HUNTLEY
ATTORNEYS United States Patent Office 3,150,841
Patented Sept. 29, 1964

3,150,841
CONTINUOUS MOTION PICTURE FILM
PROJECTION APPARATUS
Richard L. Stevens, Long Beach, Calif., assignor to Stevens-Merkle, Inc., Long Beach, Calif., a corporation of California
Filed Oct. 27, 1960, Ser. No. 65,422
7 Claims. (Cl. 242—55.19)

This invention relates generally to continuous motion picture film projection devices and more particularly to mechanism for advancing the film in an adjustable synchronized manner through such a projector.

One of the main objects of the present invention is to provide a film reel assembly and automatically operated clutch control means for power advancing film to a continuous film projector in a manner to prevent tearing of the film and to extend the life of the film.

Another object of the invention lies in the controlled power advancement of film to a projector in a continuous manner that does not deteriorate the film in any way.

Continuously operated motion picture film projectors have been used heretofore, but the rapid deterioration of film because of excess wear has rendered them unsatisfactory. Generally, the continuously moving film has heretofore been drawn into the projector by sprocket mechanism that eventually tightens the film reel and tears the film. No suitable means has been provided heretofore for taking from and putting back the same amount of film on the endless reel. The device of the present invention advances the film in an adjustably controlled manner so that the film is picked up in a loosened condition and quickly advanced in such manner that the projector sprocket mechanism cannot tear or tighten the film on the reel.

Still another object of the present invention is in the provision of an automatic clutch-controlled film advancing belt for a continuous film projector, said belt being actuated by a power-driven member operating at a speed slightly faster than the speed of the film passing through the projector.

A further object of the invention is to provide in a continuous motion picture film device a clutch mechanism sensitive to the slightest film pressure for power advancing film through the projector in a loosened condition.

A still further object of the present invention is in the manner of assembling a film reel about a clutch-controlled, roller-supported power belt whereby the film will be advanced in a synchronized yet loose manner to the sprocket of the projector.

With the foregoing objects in view, and such other objects and advantages as will become apparent to those skilled in the art to which this invention relates as this specification proceeds, the invention consists essentially in the arrangement and construction of parts all as hereinafter more particularly described, reference being had to the accompanying drawing in which:

FIGURE 6 is an enlarged view taken on line 6—6 of FIGURE 2 showing a brake mechanism used in controlling the projector sprocket;

FIGURE 7 is an elevational view in enlarged scale showing the clutch mechanism in driving engagement with the film advancing belt;

FIGURE 8 is a view similar to FIGURE 7 with the film advancing belt in non-driving position; and FIGURE 9 is a sectional view taken on the line 9—9 of FIGURE 8.

Figure 1:
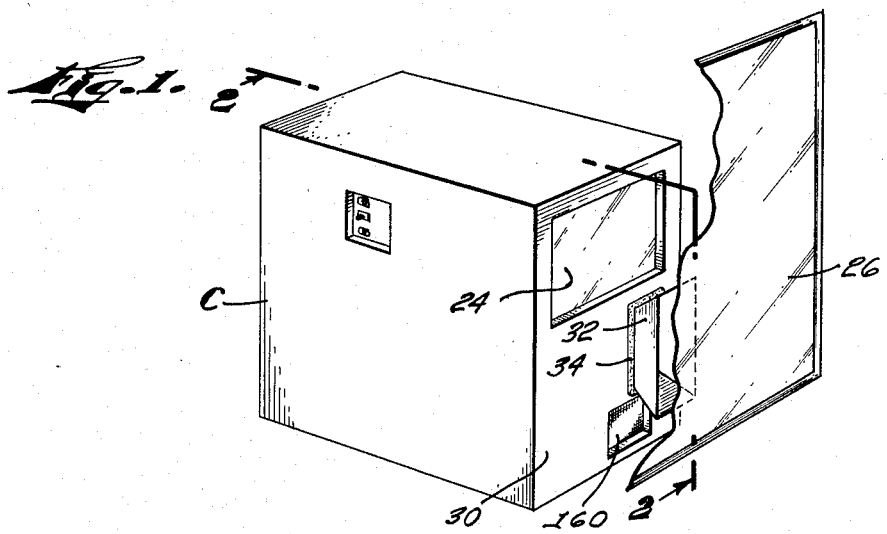
FIGURE 1 is a perspective view of a preferred form of continuous film projector embodying the present invention.
Figure 2:
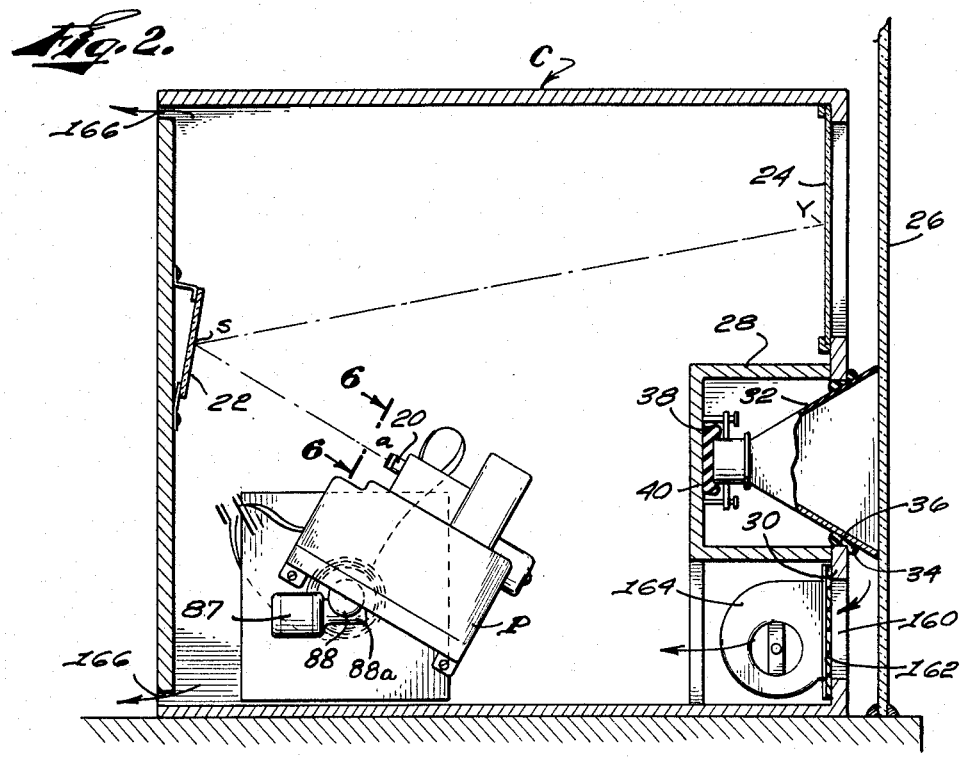
FIGURE 2 is a vertical sectional view in enlarged scale taken on the line 2—2 of FIGURE 1.

Referring to the drawings and particularly to FIGURES 1 and 2, there is shown the general assembly of a preferred form of continuous motion picture film projection apparatus embodying the present invention. The projection apparatus shown is adaptable to many uses, as for example, it may be used as a continuous advertising medium that can be operated in any desired location. The preferred embodiment of the invention herein shown may also be used as an instruction medium for schools and industry. The apparatus is capable of various uses, as will become apparent from the following description.

As indicated in FIGURE 2, the apparatus includes a cabinet C housing a conventional motion picture projector P. The optical axis $a$–$s$ of the lens system 20 of the projector P is canted at an angle to a mirror 22. The image projected by the lens system 20 is reflected by the mirror 22 to a conventional motion picture screen 24 disposed in the upper front portion of the cabinet C along an axis $s$–$y$. The cabinet C is shown positioned rearwardly of a building window 26 or the like.

An enclosing speaker box 28 is arranged within the front wall 30 of the cabinet C. A conventional speaker 32 is mounted within the speaker box 28 with the front portion of such speaker projecting forwardly of the front wall 30. The front end of the speaker 32 is pressed against the inner glass surface of the window 26. A rubber-like ring 34 is interposed between a front aperture 36 of the box 28 and the exterior front portion of the speaker 32. A rubber-like pad 38 is interposed between the rear end of the speaker 32 and the rear wall 40 of the speaker box 28. The speaker 32 is thus resiliently mounted within the speaker box 28 and the vibratory effect of the sounds generated by the speaker is believed to enhance the projecting power of the speaker outside the window 26.

A conventional motion picture projector designated generally at P is disposed within the lower rear portion of the cabinet C. This projector P includes a conventional film advancing sprocket mechanism designated generally as S, as shown in FIGURE 6. The sprocket mechanism S operates in the usual manner to advance film 42 past the lens system 20. The sprocket mechanism S is conventional in all respects with the exception that a braking device is connected to the sprocket driving mechanism S to prevent overrunning of the sprockets and film when the electric current is shut off and the projector stopped.

Dual sprockets 44 and 46 are connected by shafts 48 and 50, respectively, through conventional gearing to a drive shaft 52. A brake 54 is secured to the end of the drive shaft 52. The brake 54 has a detent 56 formed therein which is adapted to be engaged with or disengaged from a finger 58. The finger 58 slides on a vertically disposed guide 60 and has a pivotal connection 62 with a solenoid or core 64 disposed within conventional electrical widings 66 in an electrical circuit 68. The pivotal connection 62 prevents any possibility of jamming of the finger 58. A coil tension spring 70 is connected to the finger 58 at 72 and to a plate 74 at 76. During operation of the device, the core 64 is withdrawn and the finger 58 is released from the detent 56 in the brake 54. Upon cessation of electrical current, the finger 58 actuated by the spring 70 engages the detent 56 in the brake 54 and stops further movement of the sprocket driving mechanism. Overrunning of the sprockets 44 and 46 may well be controlled by other types or brake or stop mechanism.

Figure 3:
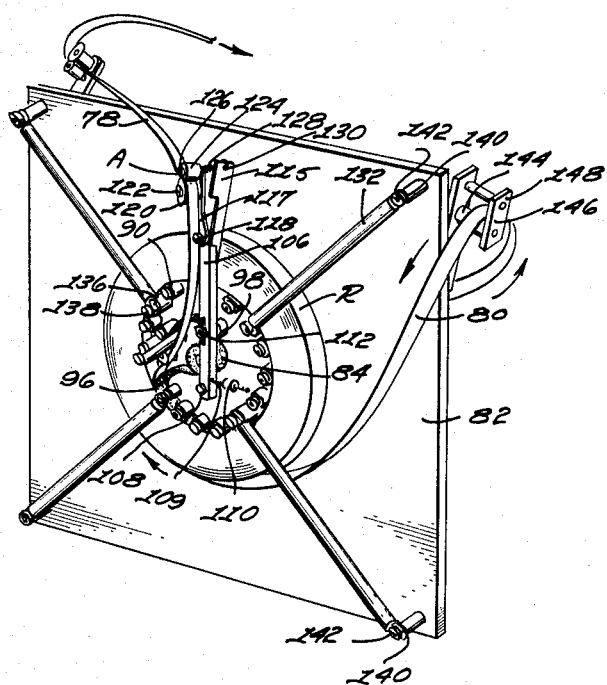
FIGURE 3 is a perspective view showing a film reel assembly and clutch mechanism for power advancing the film through said projector.

The reel or roll of film R in FIGURE 3 requires no unreeling and rewinding as in prior devices of the same general character. The reel is disposed in the position shown in FIGURE 3 and the inner end 78 is threaded through the device in the direction of the arrow. The outer end 80 of the roll is spliced to the inner end 78 and thus forms a continuous film moving in the direction of the arrows. Film is advanced from the inner part of the reel to the sprockets 44 and 46, then through the projector P, and finally returned to the outside of the reel R. The mechanism, now to be described, takes off the same amount of film as it puts back and therefore the reel R is always maintained in a released or loosened condition.

Figure 4:
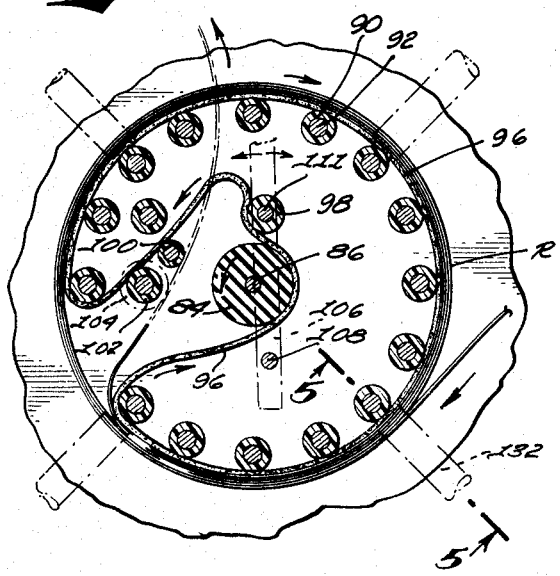
FIGURE 4 is a detailed elevational view of said film reel assembly and clutch mechanism.
Figure 5:
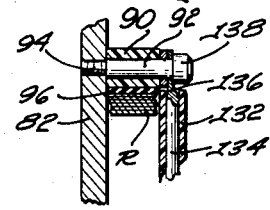
FIGURE 5 is a sectional view in enlarged scale taken on line 5—5 of FIGURE 4.

A mounting plate 82 is attached in any manner desired, vertically, horizontally or otherwise, to the projector P or a portion of the cabinet C. A rubber roller 84 is driven by a shaft 86 which in turn is driven by an electric motor 87 through a conventional worm 88 and pinion 88a. The rubber roller 84 is driven slightly faster than the speed of the film passing through the projector and therefore there is always a tendency to slight slippage automatically controlled by a clutch idler or roller to be described. A plurality of rollers 90 mounted on projecting bolts 92 threaded at 94 in the plate 82 form a circular rollered periphery upon which a continuous belt 96 is disposed. The belt 96 moves in the direction of the arrows around the rubber roller 84, beneath a clutch roller 98, and then over a roller 100. An adjacently disposed guide roller 102 is flanged at 104 in a manner to prevent lateral displacement of the belt 96. The mounting of the plural rollers 90 is oilless. The roll of film R immediately surrounds and rests upon the belt 96 as shown in FIGURES 3 and 4.

An automatic clutch A controls the movement of the belt 96 and the film. A clutch arm or bar 106 is pivotally connected at its lower end 108 to the plate 82. A manually adjustable balancing screw 109 and threaded lug 110 exert balanced weighted control of the clutch arm 106. The before mentioned clutch roller 98 is pivotally mounted on the washered end 111 of a bolt 112 adjustably connected at 113 in a slot 114 in the clutch arm 106 in operative position adjacent the power driven rubber roller 96. The upper end of the clutch arm 106 is bent outwardly away from the plate 82. A flanged plate 115 is pivotally mounted at 116 on the outwardly flared upper end of the clutch arm or bar 106 and rests thereagainst. A lower film roller plate 117 is pivotally mounted at 118 on the clutch arm 106. A flanged film roller 120 is pivotally mounted at 122 on the lower film roller plate 117. An overhead smaller roller 124 pivoted at 126 on the plate 117 holds the film in the flanged roller guide 120. A small coil spring 128 connects the upper edge of the plate 117 to the upper edge 130 of the flanged plate 115.

It is important to notice at this time that movement of the sprocket S will exert a pull on the film so as to initiate movement of the film through the rollers 120 and 124. This slight pressure moves the plate 115 away from the arm 106 under tension of the small coil spring 128. The adjustment is extremely sensitive and the clutch arm adjustably balanced by the weight 110 is moved under slight tension so that the clutch roller 98 moves in a direction to urge the belt 96 against the power-driven rubber roller 84. The belt 96 is stationary until urged against the roller 84. While stationary the surrounding reel R is also stationary. However, when the belt 96 is clutched to the rubber roller 84, the belt picks up speed and simultaneously moves the film from the inside of the reel up through the rollers 120 and 124. The roller 84 is turning slightly faster than the film is moving through the projector. Therefore, the belt 96 advances the film toward the projector sprockets 44 and 46 faster than it can be received. This variance in speed is taken up automatically by the sensitive clutch A which releases or slips the belt and thus the film when being advanced at too fast a rate. Actually, the clutch A is constantly moving toward and from the belt. The slightest pressure on the film induced by the sprocket moves the rollers 120 and 124 to operate the clutch. The belt 96 will then advance film in a loosened condition to the sprocket until there is no pressure on the film. The clutch roller 98 will then be released until called into action again.

The film is thus automatically advanced to the sprockets in a loosened condition. The sprockets draw the power advanced synchronized moving loosened film through the projector. The film is picked up again by the moving reel with the result that just as much film that is taken from the reel is returned thereto. The film advancing mecahnism is automatically self adjusting. The sprockets cannot jerk the film. They merely place the slightest tension thereon with the result that the clutch roller engages the belt 96 and rubber roller 84 to start the reel moving and the film advancing in a loosened and synchronized manner to the sprocket S.

The reel R and belt 96 are held in place on the plate 82 and prevented from lateral displacement by means of four spaced rollers 132 movable on rods 134 connected at their inner ends at 136 to the bolt heads 138 of four of the bolts 92. The outer ends of the rods 134 are attached at 140 to the heads of bolts 142 threadedly connected to the plate 82. A film roller 144 is pivotally mounted at 146 in a guiding bracket 148 secured to the plate 82. The bracketed roller obviously guides the returning film to the outside of the reel R.

The operation of the device is based primarily on the fact that the power-driven rubber roller 84 has a speed slightly faster than the speed of the film passing through the projector. Unless controlled the film would be fed to the sprockets faster than it could be received. This is controlled by the sensitive automatic clutch which never energizes the belt 96 unless there is a slight pressure on the film induced by the sprockets. However, when the sprockets exert slight pressure on the film, this pressure is transmitted to the sensitive clutch which immediately engages the roller with the belt and film is instantly fed to the sprockets at the proper lineal speed. The sensitive automatic clutch is constantly being slipped and the rubber roller 84 is continually and intermittently being stopped and started to automatically feed film to the sprockets at exactly the right speed and in a loosened condition that negatives wear and possible breakage.

Referring particularly to FIG. 2, it will be noted that the front wall of the cabinet C is formed with an air inlet 160. A screen or the like 162 covers the inlet 160. This screen is adapted to filter dirt, dust and other foreign matter out of air entering the inlet 160. A conventional squirrel-cage blower 164 is mounted within the cabinet C rearwardly of the air inlet 160. This blower 164 is driven by a conventional electric motor (not shown). The blower 164 serves to draw air inwardly through the inlet 160 into the interior of the cabinet C as indicated by the directional arrow. The air drawn into the cabinet C by the blower 164 is discharged from within the cabinet by means of a plurality of discharge apertures 166 formed in the rear wall of the cabinet, Such air will serve to cool the interior of the cabinet.

It is important to note that the comparative sizes of the inlet 160 and the discharge apertures 166, as well as the output of the blower 164, are so proportioned that at any given instant more air is being drawn into the cabinet C by the blower 164 than is being discharged from within the cabinet. Accordingly, the interior of the cabinet will exist at superatmospheric pressure. Should the cabinet contain any leaks, the air flow therethrough will be outwardly and dirt, dust and other foreign matter will be prevented from entering the cabinet C. Thus, great care to leak-proof the cabinet is not required.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A continuous film advancing device, comprising: a power-driven roller; a plurality of belt-support rollers; an endless film-advancing belt on said support rollers and engaging said power-driven roller; a film supported on said belt to be moved thereby; and a clutch sensitive to the tension of said film for engaging said belt and urging said belt against said power-driven roller with a force proportional to the tension of said film, said roller thereby driving said belt and said belt moving said film.

2. A continuous film advancing device for use with a projector having a film advancing sprocket, comprising: a power-driven roller, said roller being driven slightly faster than the film passing through said projector; multiple belt-support rollers; an endless belt wrapped about said belt-support rollers, said film being disposed about said belt to be driven by said belt towards said sprocket; and a clutch sensitive to the tension of said film as said film moves towards said sprocket, said clutch effecting engagement of said belt and power roller with a pressure determined by the tension of said film as said film moves towards said sprocket.

3. A continuous film advancing device for use with a projector having film advancing sprocket means, comprising: a plate; a plurality of belt-support rollers disposed in a generally circular configuration upon said plate; an endless belt carried by said belt-support rollers; a power-driven roller adjacent said plate and engaging said belt so as to effect movement of said belt whereby said film will be advanced towards said sprocket means by the engagement of said film with said belt; and clutch means on said plate including a clutch roller disposed adjacent said power-driven roller and urging said belt towards said power-driven roller with a force proportional to the tension of the portion of said film proximate said sprocket means.

4. A device as set forth in claim 3 wherein said clutch roller is rotatably supported at the intermediate portion of an upwardly extending bar having its lower end pivotally connected to said plate, with the upper end of said bar supporting additional roller means through which said film moves towards said sprocket means and the angular position of said bar relative to said plate being controlled by the tension with which said film passes through said additional roller means.

5. A continuous film advancing device for use with a projector having film advancing sprocket means that pulls said film into said projector, comprising: a plate; a plurality of belt-support rollers disposed upon said plate; an endless belt carried by said belt-support rollers; a power-driven roller adjacent said plate and engaging said belt so as to effect movement of said belt whereby said film will be advanced towards said sprocket means by the engagement of said film with said belt; and clutch means on said plate including a clutch roller disposed adjacent said power-driven roller and urging said belt towards said power-driven roller with a force proportional to the tension of the portion of said film proximate said sprocket means.

6. A device as set forth in claim 5 wherein said clutch roller is rotatably supported at the intermediate portion of an upwardly extending bar having its lower end pivotally connected to said plate with the upper end of said bar supporting additional roller means through which said film moves towards said sprocket means and the angular position of said bar relative to said plate being controlled by the tension with which said film passes through said additional roller means.

7. A device as set forth in claim 5 wherein brake means are provided to positively restrain said sprocket means from pulling additional film into said projector when power to said sprocket means is shut off.

References Cited in the file of this patent

UNITED STATES PATENTS

| | | |
|---|---|---|
| 1,137,912 | Sears et al. | May 4, 1915 |
| 2,031,079 | Streyckmans | Feb. 18, 1936 |
| 2,094,922 | John | Oct. 5, 1937 |
| 2,240,323 | Zimmerman | Apr. 29, 1941 |
| 2,288,983 | Weiss | July 7, 1942 |
| 2,443,248 | Hurley | June 15, 1948 |
| 2,575,579 | Bullock et al. | Nov. 20, 1951 |
| 2,670,907 | Huck | Mar. 2, 1954 |
| 2,778,636 | Eash | Jan. 22, 1957 |
| 2,880,993 | Harries et al. | Apr. 7, 1959 |